United States Patent
Do

(10) Patent No.: US 8,553,279 B2
(45) Date of Patent: Oct. 8, 2013

(54) IMAGE FORMING APPARATUS AND A CONTROL METHOD TO IMPROVE IMAGE QUALITY BASED ON AN EDGE PIXEL

(75) Inventor: Quan Do, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 573 days.

(21) Appl. No.: 12/018,418

(22) Filed: Jan. 23, 2008

(65) Prior Publication Data

US 2009/0009779 A1 Jan. 8, 2009

(30) Foreign Application Priority Data

Jul. 4, 2007 (KR) .................. 10-2007-0067057

(51) Int. Cl.
*H04N 1/60* (2006.01)

(52) U.S. Cl.
USPC .............................. 358/1.9; 358/518; 358/474

(58) Field of Classification Search
USPC ...................................................... 358/3.27
See application file for complete search history.

(56) References Cited

U.S. PATENT DOCUMENTS

| | | | | |
|---|---|---|---|---|
| 5,134,667 A * | 7/1992 | Suzuki | ............... | 382/164 |
| 5,523,849 A * | 6/1996 | Jamzadeh | ............... | 358/1.9 |
| 6,227,725 B1 * | 5/2001 | Ancin et al. | ............... | 358/1.9 |
| 6,317,128 B1 | 11/2001 | Harrison et al. | | |
| 6,466,693 B1 * | 10/2002 | Otsu et al. | ............... | 382/176 |
| 6,757,081 B1 * | 6/2004 | Fan et al. | ............... | 358/474 |
| 6,999,197 B1 * | 2/2006 | Nabeshima | ............... | 358/1.9 |
| 7,327,492 B2 * | 2/2008 | Yokochi | ............... | 358/1.9 |
| 7,649,649 B2 * | 1/2010 | Eschbach et al. | ............... | 358/1.9 |
| 7,672,022 B1 * | 3/2010 | Fan | ............... | 358/474 |
| 7,747,077 B2 * | 6/2010 | Murakami | ............... | 382/180 |
| 2005/0206983 A1 * | 9/2005 | Kawai et al. | ............... | 358/532 |
| 2006/0062476 A1 * | 3/2006 | Yamada | ............... | 382/224 |
| 2007/0019242 A1 * | 1/2007 | Hirayama | ............... | 358/3.24 |
| 2007/0109569 A1 * | 5/2007 | Eschbach et al. | ............... | 358/1.9 |
| 2007/0115506 A1 * | 5/2007 | Yada | ............... | 358/3.06 |

FOREIGN PATENT DOCUMENTS

| | | |
|---|---|---|
| JP | 2001-223912 | 8/2001 |
| KR | 1020050107157 | 11/2005 |

OTHER PUBLICATIONS

Color Vision and Colorimetrey—Daniel Malacara.*

* cited by examiner

*Primary Examiner* — Twyler Haskins
*Assistant Examiner* — Christopher D Wait
(74) *Attorney, Agent, or Firm* — Stanzione & Kim, LLP

(57) ABSTRACT

An image forming apparatus and a control method to improve image quality. In the image forming apparatus, an edge detecting unit detects an edge pixel from scanned image data, an edge processing unit determines whether the edge pixel is a color edge pixel or a black edge pixel and applies independent edge processing methods to the color edge pixel and the black edge pixel, and a print unit prints the scanned image data using the processed edge pixel.

17 Claims, 7 Drawing Sheets

FIG. 4

| 51 | 50 | 52 |
|----|----|----|
| 48 | 50 | 50 |
| 49 | 48 | 49 |

50 — TARGET PIXEL

FIG. 5A

| 15 | 15 | 15 |
|----|----|----|
| 15 | 10 | 14 |
| 15 | 14 | 14 |

$P_1$

IMAGE FORMING APPARATUS AND A CONTROL METHOD TO IMPROVE IMAGE QUALITY BASED ON AN EDGE PIXEL

CROSS-REFERENCE TO RELATED APPLICATIONS

This application claims priority under 35 U.S.C. §119(a) of Korean Patent Application No. 10-2007-0067057, filed on Jul. 4, 2007, in the Korean Intellectual Property Office, the disclosure of which is incorporated herein by reference in its entirety.

BACKGROUND OF THE INVENTION

1. Field of the Invention

The present general inventive concept relates to an image forming apparatus and a control method to improve image quality, and more particularly to an image forming apparatus which improves color image quality by sharpening color edges and black edges independently, and a control method to improve the image quality.

2. Description of the Related Art

Image processing apparatuses, such as printers, copy machines, facsimile machines, or multifunction devices, print a desired image on paper. In particular, image forming apparatuses, such as copy machines, or multifunction devices, scan documents, generate digital data, convert the digital data into printable data, and print the printable data onto paper.

When an image is scanned and printed, edge pixels of the image are blurred. In order to reduce blurring, the image forming apparatus sharpens the scanned image data.

However, a conventional image forming apparatus sharpens color pixels and black pixels in the same manner. If a sharpened image is printed, under-sharpening occurs at the edges of white areas such as a background, and over-sharpening occurs at the edges of dark areas.

FIG. 1 is a graph illustrating under-sharpening and over-sharpening occurring in the conventional image forming apparatus. In FIG. 1, the dotted line indicates an ideal result after sharpening. Under-sharpening point A indicates that sharpening is not sufficiently performed, and exemplifies a white background area that is not sharpened as white color. Over-sharpening point B indicates that sharpening is over-performed, and exemplifies dark edge areas that are sharpened darker than an actual color. Thus, when a scanned document is printed, image distortion such as noise or artifact images is caused at edges where over-sharpening B or under-sharpening A occurs.

SUMMARY OF THE INVENTION

The present general inventive concept provides an image forming apparatus to improve image quality by sharpening color edges and black edges independently so as to reduce image noise or artifacts, and a control method to improve the image quality.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing an image forming apparatus to improve image quality, the image forming apparatus including an edge detecting unit to detect an edge pixel from image data, an edge processing unit to determine whether the edge pixel is a color edge pixel or a black edge pixel, and to apply an independent respective edge process method to the color edge pixel and to the black edge pixel, and a print unit to print the image data using the processed edge pixel.

The edge processing unit may determine an area of the image data where the color edge pixel is located, and may adjust a color of the color edge pixel to a color of a pixel which is closest to the color edge pixel in the determined area.

The edge processing unit may adjust the luminance value of the color edge pixel with reference to luminance values of pixels adjacent to the color edge pixel.

In the image forming apparatus, if a luminance value of the color edge pixel is greater than a predetermined maximum threshold value, the edge processing unit may adjust the luminance value of the color edge pixel to the maximum threshold value, and if the luminance value of the color edge pixel is lower than a predetermined minimum threshold value, the edge processing unit may adjust the luminance value of the color edge pixel to the minimum threshold value.

In the image forming apparatus, the maximum threshold value may be equal to or greater than a maximum luminance value of pixels adjacent to the color edge pixel, and the minimum threshold value may be equal to or lower than a minimum luminance value of pixels adjacent to the color edge pixel.

The image forming apparatus may further include a color adjusting unit which determines whether the processed color edge pixel is included in one of yellow, cyan, and magenta color domains, and adjusts upwards the color level corresponding to the color edge pixel within a color domain including the color edge pixel if the processed color edge pixel is included in one of the yellow, cyan, and magenta color domains.

The image forming apparatus may further include a non-edge processing unit which performs smoothing filtering for non-edge pixels of the image data.

In the image forming apparatus, if a saturation value of the edge pixel is greater than a predetermined threshold value the edge processing unit may determine that the edge pixel is a color edge pixel, and if a saturation value of the edge pixel is lower than the predetermined threshold value the edge processing unit may determine that the edge pixel is a black edge pixel.

The foregoing and/or other aspects and utilities of the present general inventive concept may also be achieved by providing a control method to improve image quality, the control method including detecting an edge pixel from image data, determining whether the detected edge pixel is a color edge pixel or a black edge pixel, applying a respective independent edge processing method to the color edge pixel and to the black edge pixel, and printing the image data using the processed edge pixel.

In the respective independent edge processing of the control method, an area of the image data where the color edge pixel is located may be determined, and a color of the color edge pixel may be adjusted to a color of a pixel which is closest to the color edge pixel in the determined area.

In the respective independent edge processing of the control method, sharpening may be performed by adjusting a luminance value of the color edge pixel with reference to luminance values of pixels adjacent to the color edge pixel.

In the respective independent edge processing of the control method, if the luminance value of the color edge pixel is greater than a predetermined maximum threshold value, the luminance value of the color edge pixel may be adjusted to the maximum threshold value, and if the luminance value of the color edge pixel is lower than a predetermined minimum threshold value, the luminance value of the color edge pixel may be adjusted to the minimum threshold value.

In the respective independent edge processing of the control method, the maximum threshold value may be equal to or greater than a maximum luminance value of pixels adjacent to the color edge pixel, and the minimum threshold value may be equal to or lower than a minimum luminance value of pixels adjacent to the color edge pixel.

The control method may further include determining whether the processed color edge pixel is included in one of yellow, cyan, and magenta color domains, and adjusting upwards a color level corresponding to the color edge pixel within a color domain including the color edge pixel if the processed color edge pixel is included in one of the yellow, cyan, and magenta color domains.

The control method may further include performing smoothing filtering of non-edge pixels of the image data.

In the respective independent edge processing of the control method, if a saturation value of the edge pixel is greater than a predetermined threshold value it may be determined that the edge pixel is a color edge pixel, and if a saturation value of the edge pixel is lower than the predetermined threshold value it may be determined that the edge pixel is a black edge pixel.

In the image forming apparatus, the image data may be scanned image data.

In the control method, the image data may be scanned image data.

The foregoing and/or other aspects and utilities of the present general inventive concept may also be achieved by providing an image forming apparatus, including an pixel edge determining unit to determine whether image input data includes an edge pixel of an image and to output determined edge pixels on a separate output path than determined non-edge pixels, an edge processing unit to divide determined edge pixels into black edge pixels and non-black edge pixels and to output black edge pixels on a separate output path than non-black edge pixels, a black edge sharpening unit to apply a first sharpening method to the black edge pixels, a non-black edge sharpening unit to apply a second sharpening method to the non-black edge pixels, and a print unit to print the image input data using the sharpened black edge pixels and the sharpened non-black pixels.

The image forming apparatus, where the edge processing unit may determine whether a determined edge pixel is a black edge pixel or a non-black edge pixel by calculating a saturation value from the image input data having a YCbCr value corresponding to the respective determined edge pixel and comparing the calculated saturation value to a predetermined threshold value.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIG. 4 is a drawing provided to illustrate a gradient method to detect edge pixels;

FIGS. 5A and 5B are drawings provided to illustrate a method to perform image sharpening by adjusting a luminance value of a target pixel which is currently processed from among color edge pixels by a color edge adjusting unit;

FIG. 6 is a graph illustrating the result of sharpening by a color edge adjusting unit;

DETAILED DESCRIPTION OF THE PREFERRED EMBODIMENTS

Figure 1:
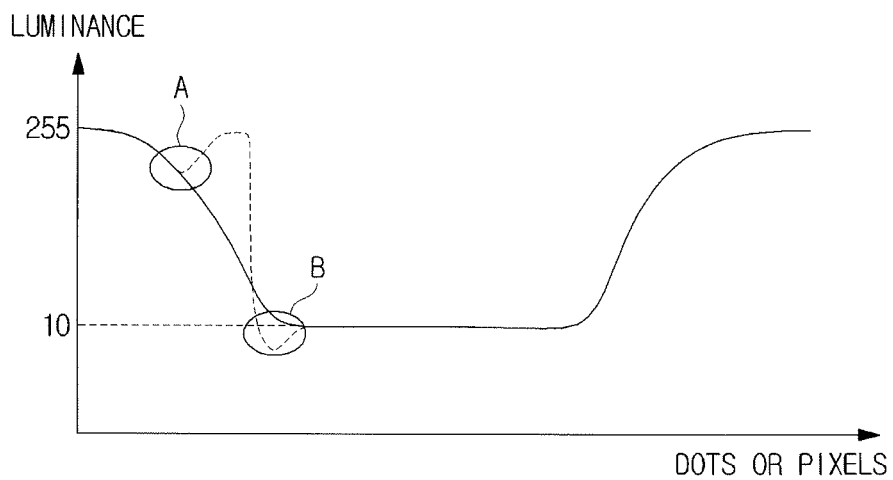
FIG. 1 is a graph illustrating under-sharpening and over-sharpening occurring in a conventional image forming apparatus.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
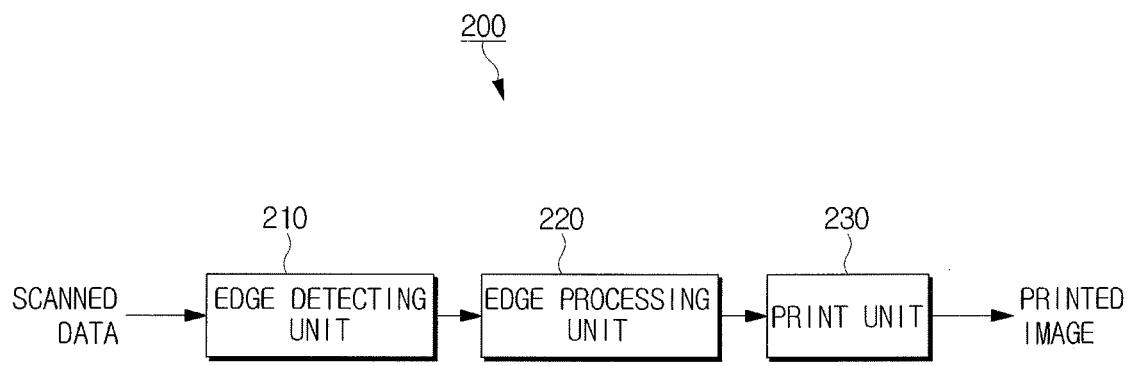
FIG. 2 is a block diagram illustrating an image forming apparatus to improve image quality according to an exemplary embodiment of the present general inventive concept.

FIG. 2 is a block diagram illustrating an image forming apparatus to improve image quality according to an exemplary embodiment of the present general inventive concept.

With reference to FIG. 2, an image forming apparatus 200 includes an edge detecting unit 210, an edge processing unit 220, and a print unit 230. The edge detecting unit 210 detects edge pixels from input data. The input data are data such as image data of an image scanned by an optical device, or may be photographic image data input from an external device such as a PC, and may include a luminance and a chrominance component. The edge detecting unit 210 may detect edge pixels using a gradient method which is described below.

The edge processing unit 220 divides edge pixels detected by the edge detecting unit 210 into black edge pixels and color edge pixels. The color edge pixels are pixels having colors other than black. The edge processing unit 220 applies independent sharpening methods to black edge pixels and color edge pixels to improve over-sharpening or under-sharpening errors as illustrated in FIG. 1. Sharpening is a technique to define edge pixels.

For example, the edge processing unit 220 may sharpen black edge pixels using a method disclosed in Korean Patent Application No. 2007-0022604. To sharpen color edge pixels, the edge processing unit 220 sharpens color edge pixels using luminance values of pixels adjacent to color edge pixels.

The print unit 230 prints the image, which may be a scanned image, on paper using edge pixels sharpened by the edge processing unit 220.

As illustrated in the above example, the image forming apparatus 200 sharpens black edge pixels and color edge pixels separately to minimize over-sharpening and under-sharpening. As a result, an edge of an image printed on paper has minimized image noise and artifact.

Figure 3:
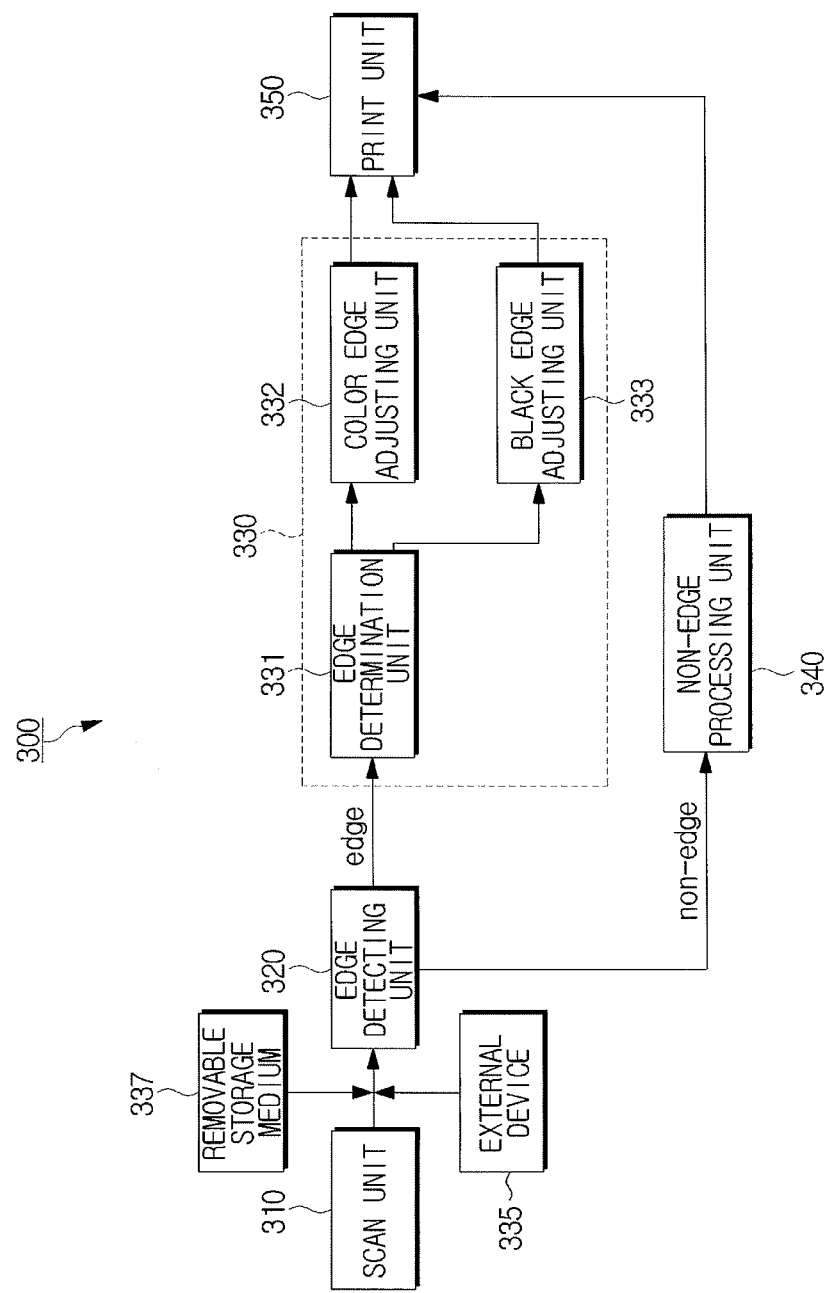
FIG. 3 is a block diagram illustrating an image forming apparatus to improve image quality according to another exemplary embodiment of the present general inventive concept.

FIG. 3 is a block diagram illustrating an image forming apparatus to improve image quality according to another exemplary embodiment of the present general inventive concept.

With reference to FIG. 3, an image forming apparatus 300 includes a scan unit 310, an edge detecting unit 320, an edge processing unit 330, a non-edge processing unit 340, and a print unit 350. The image forming apparatus 300 may be a printer or a multifunction device which scans a document, generates digital data of the scanned image, and prints the data. In other embodiments, the digital data input to the edge detecting unit may be image data input from an external device 335 such as a PC, or from a removable storage medium 337, and may be digital data of an externally scanned image, a photograph, or other image.

The scan unit 310 scans a document and outputs data from the scanned image to the edge detecting unit 320. The output data include luminance, hue, and saturation values for each pixel. For example, the output data can be expressed using YCbCr coordinates, where Y is luminance, and Cb and Cr are color differences.

The edge detecting unit 320 detects edge pixels from the data output from the scan unit 310 using a gradient method. The detected edge pixels are input to the edge processing unit 330, and the detected non-edge pixels are input to the non-edge processing unit 340.

The gradient method is a method in which a (m×n) pixel window centering on a target pixel is set, the difference between the maximum value and the minimum value of luminance values of adjacent pixels in the set window is calculated, and it is determined that the target pixel is an edge pixel if the difference between the maximum value and the minimum value of luminance values of adjacent pixels is greater than a predetermined first threshold value. The first threshold value may be pre-calculated in a design stage and stored in a register (not illustrated) of the image forming apparatus 300, and can be changed.

FIG. 4 is a drawing provided to illustrate a gradient method to detect edge pixels.

With reference to FIG. 4, a target pixel is selected to process input data. The edge detecting unit 320 sets a (3×3) window, with m and n each set equal to 3, centered on the target pixel, including luminance values of adjacent pixels, and calculates the difference between a maximum luminance value and a minimum luminance value of the luminance values of the adjacent pixels in the window. That is, the edge detecting unit 320 calculates a difference of 4, which is the difference between 52 (the maximum adjacent luminance value) and 48 (the minimum adjacent luminance value), and compares the difference value 4 and a first threshold luminance value (for example, 30). Since 4 is lower than the first threshold value in this example, the edge detecting unit 320 determines that the target pixel is not an edge pixel.

With reference to FIG. 3, the edge processing unit 330 determines if a detected edge pixel is a black edge pixel or a color edge pixel, and applies independent sharpening methods to a black edge pixel and a color edge pixel to minimize over-sharpening or under-sharpening error. To this end, the edge processing unit 330 includes a color edge determination unit 331, a color edge adjusting unit 332, and a black edge adjusting unit 333.

The color edge determination unit 331 determines if an edge pixel detected by the edge detecting unit 320 is a black edge pixel or a color edge pixel. The color edge pixel is an edge pixel having a color other than black.

For example, the color edge determination unit 331 calculates a saturation value from the scanned data and determines if an edge pixel detected by the edge detecting unit 320 is a black edge pixel or a color edge pixel. If the data output from the scan unit 310 has a YCbCr value, the color edge determination unit 331 determines if it is a color edge pixel using the following Formula 1.

$$\text{saturation} = \sqrt{Cb^2 + Cr^2}$$ [Formula 1]

Where Cb and Cr are color differences. The color edge determination unit 331 compares the calculated saturation value and a predetermined second threshold value. If the saturation value is greater than the second threshold value, the color edge determination unit 331 determines that the current pixel is a color edge pixel, and outputs the current pixel to the color edge adjusting unit 332. Alternatively, if the calculated saturation value is lower than the second threshold value, the color edge determination unit 331 determines that the current pixel is a black edge pixel, and outputs the current pixel to the black edge adjusting unit 333. The second threshold value may be pre-calculated in a design stage and stored in a register (not illustrated) of the image forming apparatus 300, and can be changed.

The color edge adjusting unit 332 confirms (i.e., determines) the area where the color edge pixel is located, and adjusts the color of the color edge pixel to a color of a pixel which is closest to the color edge pixel in the area. For example, if it is confirmed that the color edge pixel is located at an edge of a particular text in the scanned image, the color edge adjusting unit 332 determines the pixel which is closest to the color edge pixel or a pixel which has the most similar color to the color edge pixel among the adjacent pixels located in the particular text, and adjusts the color of the color edge pixel to the color of the determined pixel.

Alternatively, the color edge adjusting unit 332 may perform a sharpening function by adjusting the luminance value of the color edge pixel with reference to luminance values of pixels adjacent to the color edge pixel.

In more detail, if the luminance value of the target pixel is greater than a predetermined maximum threshold value, the color edge adjusting unit 332 adjusts the luminance value of the target pixel to the maximum threshold value. Alternatively, if the luminance value of the target pixel is lower than a predetermined minimum threshold value, the color edge adjusting unit 332 adjusts the luminance value of the target pixel to the minimum threshold value. The maximum threshold value is equal to or greater than the maximum luminance value of pixels adjacent to the target pixel, and the minimum threshold value is equal to or lower than the minimum luminance value of pixels adjacent to the target pixel.

Figures 5B, 6:
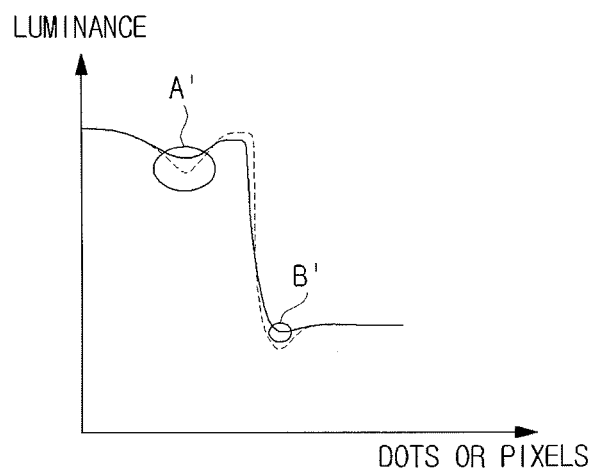

FIGS. 5A and 5B are drawings provided to illustrate a method to perform sharpening by adjusting a luminance value of a target pixel which is currently processed from among color edge pixels by the color edge adjusting unit 332.

With reference to FIG. 5A, the color edge adjusting unit 332 sets a (m×n) window (where m and n are each set equal to 3, but are not limited thereto) centering on a target pixel p1, and calculates a maximum threshold value using the formula [maximum luminance value+α] and calculates a minimum threshold value using the formula [minimum luminance value−α]. The maximum luminance value is the maximum value of luminance values of adjacent pixels of the target pixel p1 in the window, and the minimum luminance value is the minimum value of luminance values of adjacent pixels of the target pixel p1 in the window, and a is a predetermined offset value of a particular design.

In FIG. 5A, the maximum luminance value in the selected pixel window is 15, the minimum luminance value is 14, and it is assumed that α is 3. The color edge adjusting unit 332 ignores the luminance value '10' of the target pixel p1 since the luminance value '10' is lower than the maximum threshold value of 18 ('15+3'). The color edge adjusting unit 332 adjusts the luminance value '10' of the target pixel p1 to be '11' since the luminance value '10' is lower than the minimum threshold value calculated by [minimum luminance value−α, where '14−3=11']. Thus, the color edge adjusting unit 332 outputs the luminance value of the target pixel p1 as '11'.

With reference to FIG. 5B, the color edge adjusting unit 332 sets a (3×3) window centering on a target pixel p2. In FIG. 5B, the maximum luminance value is 250, the minimum luminance value is 0, and it is assumed that α is 3. The color edge adjusting unit 332 adjusts the luminance value '255' of the target pixel p2 to be '253' since the luminance value '255' is greater than the maximum threshold value calculated by [maximum luminance value+α, where '250+3=253']. Thus, the color edge adjusting unit 332 outputs the luminance value of the target pixel p2 as '253'.

The above description and a method of operations of the color edge adjusting unit 332 can be expressed as follows:

if $p$>Max+α, then, $p$=Max+α else if $p$<Min−α, then, $p$=Min−α else $p$=$p$      [Formula 2]

In Formula 2, p is the target pixel to be sharpened among color edge pixels, Max is the maximum luminance value of luminance values of pixels adjacent to the target pixel, Min is the minimum luminance value of luminance values of pixels adjacent to the target pixel, and α is the offset value stored in a register (not illustrated). Thus, the color edge adjusting unit 332 sharpens a color edge pixel using a method that is consistent with Formula 2.

With reference to FIG. 3 again, the black edge adjusting unit 333 sharpens a black edge pixel to define a black edge. As an example, the black edge adjusting unit 333 may perform sharpening using a method disclosed in Korean Patent Application No. 2007-0022604. The present general inventive concept is not limited to that method. The method disclosed in Korean Patent Application No. 2007-0022604 is, briefly, that the edge processing unit 330 determines a maximum luminance value and a minimum luminance value of pixels of a window centering on a black edge pixel, and calculates a single threshold value using the maximum luminance value and the minimum luminance value. The threshold value is calculated using the formula ['max−(max−min)*a'], where max is the maximum luminance value min is the minimum luminance value, and a' is a value between 0 and 1. The edge processing unit 330 lowers the luminance value of the target pixel if the target pixel is lower than the threshold value. Consequently, the target pixel is made darker, and thus more defined.

FIG. 6 is a graph illustrating the result of sharpening by the color edge adjusting unit 332.

In FIG. 6, the dotted line indicates the result of sharpening color edge pixels using a conventional method, and the solid line indicates the result of sharpening color edge pixels using a method according to the present general inventive concept. It illustrates that the method according the present general inventive concept reduces under-sharpening at A' compared to the conventional method and provides sharpening at B' to a greater degree than in the conventional method. This results in a smoother sharpening curve for the present method than for the conventional method.

Referring to FIG. 3, the non-edge processing unit 340 performs a smoothing filtering function for non-edge pixels of the data input from edge detecting unit 320, which may be scanned image data. That is, the non-edge processing unit 340 applies a smoothing filtering function, such as low pass filtering, to non-edge pixels output from the edge detecting unit 320. Consequently, non-edge pixels belonging to a background or image area are smoothed or to some extent blurred.

The print unit 350 converts the pixels, which are output from the color edge adjusting unit 332, the black edge adjusting unit 333, and the non-edge processing unit 340, into printable data, and prints the data on a printing medium, such as printing paper. The print unit 350 forms the color black of black edge pixels by mixing a Cyan-Magenta-Yellow-Black (CMYK) developer or by using a K developer.

Figure 7:
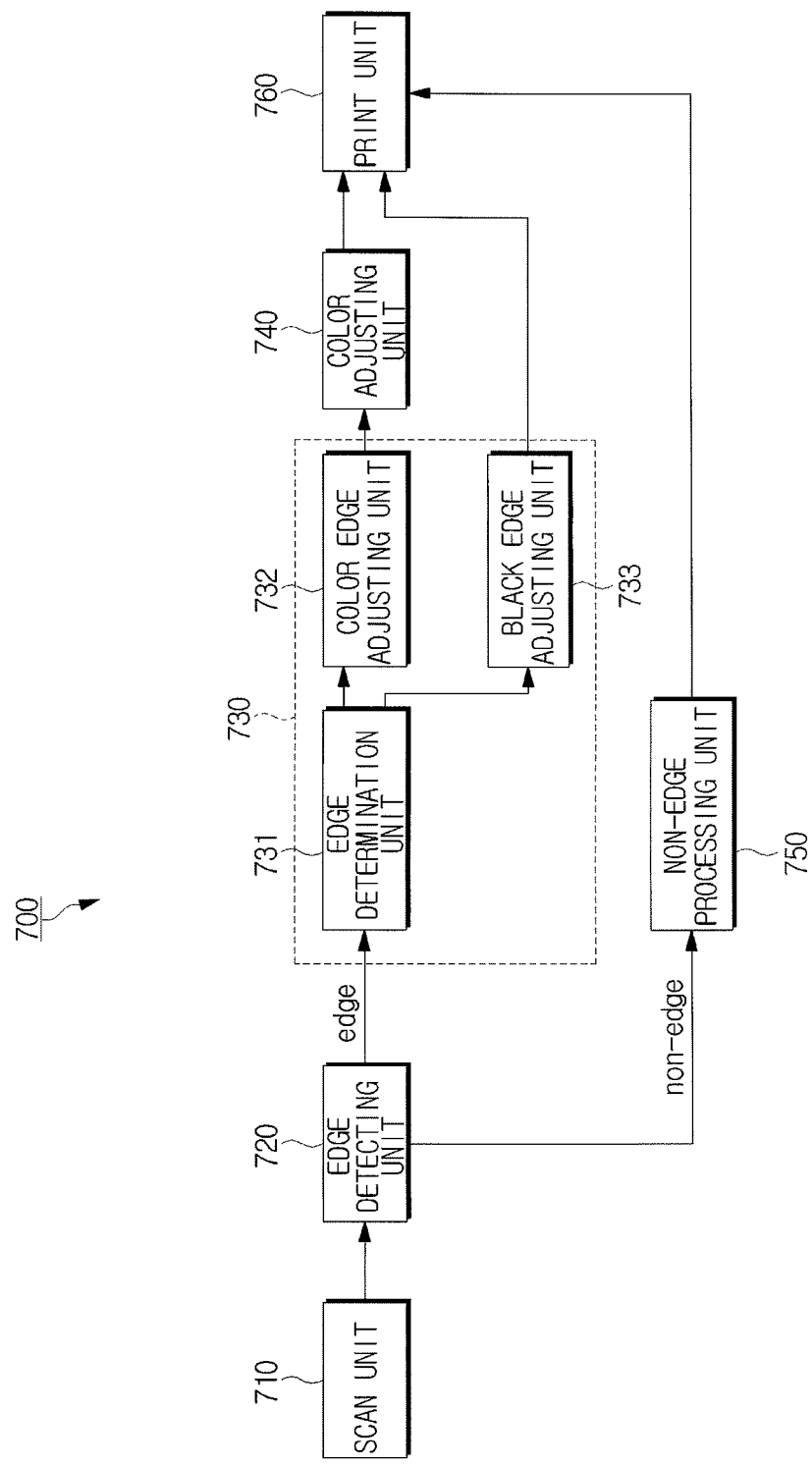
FIG. 7 is a block diagram illustrating an image forming apparatus to improve image quality according to another exemplary embodiment of the present general inventive concept.

FIG. 7 is a block diagram illustrating an image forming apparatus to improve image quality according to another exemplary embodiment of the present general inventive concept.

With reference to FIG. 7, an image forming apparatus 700 includes a scan unit 710, an edge detecting unit 720, an edge processing unit 730, a color adjusting unit 740, a non-edge processing unit 750, and a print unit 760. The scan unit 710, the edge detecting unit 720, the edge processing unit 730, the non-edge processing unit 750, and the print unit 760 in FIG. 7 each have functions identical to those of corresponding functional blocks described above in regard to FIG. 3, so a further detailed description is omitted.

The color adjusting unit 740 adjusts a color value of a color edge pixel sharpened by the color edge adjusting unit 732 to have a greater magnitude to define the color of the color edge pixel. To this end, the color adjusting unit 740 converts a sharpened color edge pixel into CMYK coordinates. Then, the color adjusting unit 740 determines whether the converted color edge pixel is included in one of yellow, cyan, and magenta color domains. If the converted color edge pixel is included in one of yellow, cyan, and magenta color domains, the color adjusting unit 740 adjusts a color level value corresponding to the color edge pixel to have a greater magnitude within a color domain.

Figure 8:
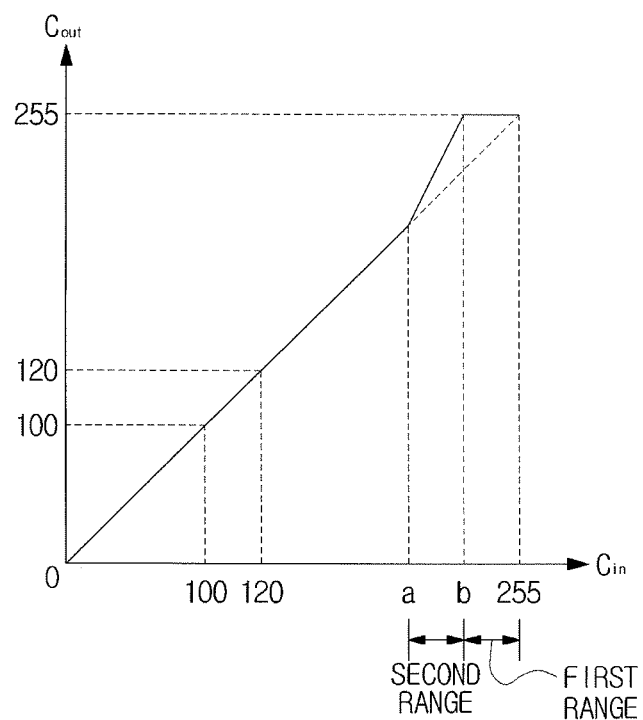
FIG. 8 is a graph provided to illustrate a method to adjust a color edge pixel corresponding to a cyan color.

FIG. 8 is a graph provided to illustrate a method to adjust a color edge pixel corresponding to a cyan color using the color adjusting unit 740. With reference to FIG. 8, if the CMYK coordinates of a color edge pixel converted by the color adjusting unit 740 are, for example, C=120, M=0, Y=0, and K=0, the color adjusting unit 740 determines that the color edge pixel belongs to a cyan color domain. If respective values of M, Y, and K are each less than a third threshold value, and a value of C is greater than a fourth threshold value, the color adjusting unit 740 determines that a color edge pixel is included in a cyan color domain. If a cyan input value $C_{in}$ of a color edge pixel is included in a first range, the color adjusting unit 740 adjusts the cyan input value $C_{in}$ upwards to an expressible maximum value. If color information of cyan is expressed using 8 bits, the color adjusting unit 740 uses the value '255' as an expressible maximum value. If the cyan input value $C_{in}$ of the color edge pixel is included in a second range, the color adjusting unit 740 adjusts the cyan input value $C_{in}$ upwards using a slope of a line as illustrated in FIG. 8.

The first and second ranges are set on the basis of a maximum value to express color information of cyan, for example, the value '255', and may be pre-calculated in a design stage together with the first through fourth threshold values, described above, and may be stored in a register (not illustrated). In addition, the first and second ranges can be changed by a user.

Referring to FIG. 8, since a color edge pixel having a value of C of '120' is not included in the first or second ranges, a cyan output value $C_{out}$ is '120'. As another example, if the first range is between 200 and 255 and $C_{in}$ is 210, the color adjusting unit 740 adjusts $C_{out}$ upwards to the value '255'.

The print unit 760 converts color edge pixels output from the color adjusting unit 740, black edge pixels output from the black edge adjusting unit 733, and non-edge pixels output from the non-edge processing unit 750 into printable data, and prints the data on a printing medium, such as printing paper.

Figure 9:
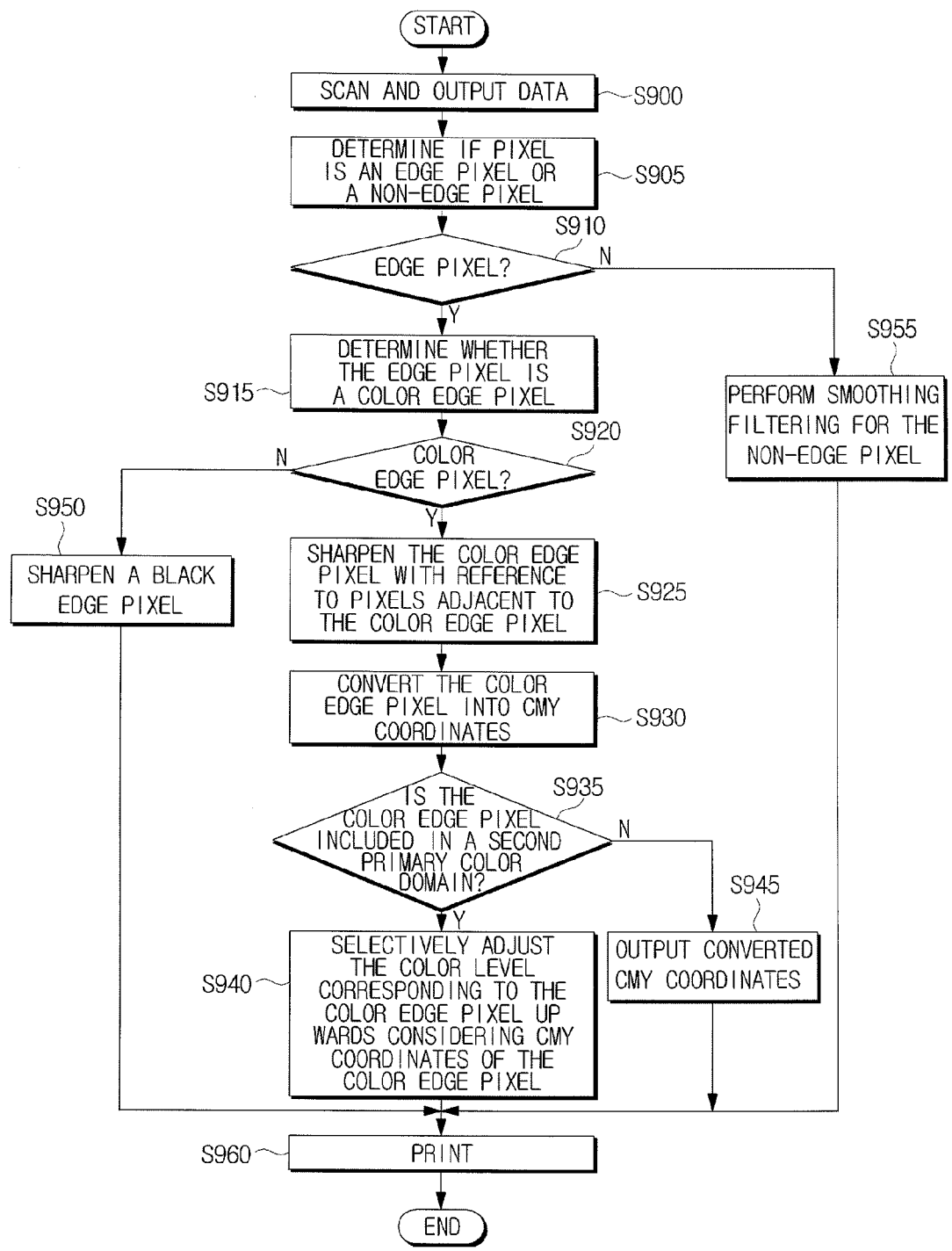
FIG. 9 is a flow chart illustrating a control method to improve image quality in an image forming apparatus according to an exemplary embodiment of the present general inventive concept.

FIG. 9 is a flow chart illustrating a control method to improve image quality in an image forming apparatus according to an exemplary embodiment of the present general inventive concept.

With reference to FIG. 7, the scan unit 710 scans a document and outputs scanned image data in operation S900. The image data includes luminance and saturation values.

In operations S905 and S910, the edge detecting unit 720 detects a pixel and determines if a pixel of the data output in operation S900 is an edge pixel or a non-edge pixel.

If the pixel is determined to be an edge pixel in operation S910, the edge determination unit 731 determines whether the edge pixel is a black edge pixel or a color edge pixel in operations S915 and S920. For example, if data output from operation S900 has a YCbCr value, in operations S915 and S920 the edge determination unit 731 determines whether or not the edge pixel is a color edge pixel using Formula 1 described above.

If the edge pixel is determined to be a color edge pixel in operation S920, the color edge adjusting unit 732 sharpens the color edge pixel with reference to pixels adjacent to the color edge pixel in operation S925.

As an example, the color edge adjusting unit 732 determines an area where the color edge pixel is located, and adjusts the color of the color edge pixel to the color of the pixel which is closest to the color edge pixel in the area where the color edge pixel is located. Alternatively, the color edge adjusting unit 732 may adjust a luminance value of the color edge pixel with reference to luminance values of pixels adjacent to the color edge pixel. Therefore, as illustrated in FIG. 6, under-sharpening as illustrated by the dotted line at A' is effectively reduced and sharpening to a greater level than as illustrated by the dotted line at B' is effectively achieved.

After operation S925, the color adjusting unit 740 converts the sharpened color edge pixel into CMYK coordinates in operation S930.

Subsequently, the color adjusting unit 740 determines whether the converted color edge pixel is included in a second primary color domain in operation S935. If the converted color edge pixel is included in the second primary color domain, the color adjusting unit 740 selectively adjusts a color level upwards corresponding to the color edge pixel considering CMY coordinates of the color edge pixel, in operation S940. In other words, if a color level corresponding to the color edge pixel is greater than a predetermined value, the color adjusting unit 740 adjusts the color level upwards. The second primary color domain includes yellow, cyan, and magenta color domains. The predetermined value is the lowest limit of a first range or the lowest limit of a second range, as illustrated in FIG. 8.

If it is determined that the converted color edge pixel is not included in the second primary color domain in operation S935, the color adjusting unit 740 outputs CMY coordinates converted in operation S930 to the print unit 760 in operation S945.

An edge pixel, which is determined to be a black edge pixel in operation S920, is sharpened by the black edge adjusting unit 733 and is defined in operation S950.

If the pixel detected in operation S905 is a non-edge pixel in operation S910, the non-edge processing unit 750 performs a smoothing filtering function for the non-edge pixel in operation S955.

In operation S960, the print unit 760 converts pixels processed through operations S900 through S955 into printable data, and prints the data on a printing medium, such as printing paper, using a print engine.

In the embodiment of the image forming apparatus 300 as illustrated in FIG. 3, the operations S930 to S945 may be omitted.

As can be appreciated from the above description of an image forming apparatus and a control method to improve image quality, a color edge pixel and a black edge pixel are sharpened independently so that image noise or artifacts usually occurring in color pixel edges can be reduced. Moreover, if a color of an edge pixel is close to a second primary color, the edge pixel color is changed and printed having the second primary color, and a more defined image can be obtained.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus to improve image quality, the image forming apparatus comprising:
    an edge detecting unit to detect an edge pixel from image data;
    an edge processing unit to determine whether the edge pixel is a color edge pixel or a black edge pixel by using a chrominance component of the edge pixel, the edge processing unit comprising:
    a color edge adjusting unit to apply a first edge sharpening method to the edge pixel if the edge pixel is the color edge pixel, the first edge sharpening method including determining an area of the image data where the color edge pixel is located and adjusting a luminance value of the color edge pixel with reference to luminance values of pixels adjacent to the color edge pixel in the determined area; and
        a black edge adjusting unit to apply a second edge sharpening method to the edge pixel if the edge pixel is the black edge pixel such that the first edge sharpening method and the second edge sharpening method are different; and
    a print unit to print the image data using the processed edge pixel.

2. The image forming apparatus of claim 1, wherein if the luminance value of the color edge pixel is greater than a predetermined maximum threshold value, the color edge adjusting unit adjusts the luminance value of the color edge pixel to the maximum threshold value, and if the luminance value of the color edge pixel is lower than a predetermined minimum threshold value, the color edge adjusting unit adjusts the luminance value of the color edge pixel to the minimum threshold value.

3. The image forming apparatus of claim 2, wherein the maximum threshold value is equal to or greater than a maximum luminance value of pixels adjacent to the color edge pixel, and the minimum threshold value is equal to or lower than a minimum luminance value of pixels adjacent to the color edge pixel.

4. The image forming apparatus of claim 1, further comprising:

a color adjusting unit which determines whether the processed color edge pixel is included in one of yellow, cyan, and magenta color domains, and adjusts upwards the color level corresponding to the color edge pixel within a color domain including the color edge pixel if the processed color edge pixel is included in one of the yellow, cyan, and magenta color domains.

5. The image forming apparatus of claim 1, further comprising:
a non-edge processing unit which performs smoothing filtering for non-edge pixels of the image data.

6. The image forming apparatus of claim 1, wherein if a saturation value of the edge pixel is greater than a predetermined threshold value the edge processing unit determines that the edge pixel is a color edge pixel, and if a saturation value of the edge pixel is lower than the predetermined threshold value the edge processing unit determines that the edge pixel is a black edge pixel.

7. A control method to improve image quality, the control method comprising:
detecting an edge pixel from image data;
determining whether the detected edge pixel is a color edge pixel or a black edge pixel by using a chrominance component of the edge pixel;
applying a first edge sharpening method to the detected edge pixel if the detected edge pixel is determined to be the color edge pixel, the first edge sharpening method including determining an area of the image data where the color edge pixel is located and adjusting a luminance value of the color edge pixel with reference to luminance values of pixels adjacent to the color edge pixel in the determined area;
applying a second edge sharpening method to the detected edge pixel if the detected edge pixel is determined to be the black edge pixel such that the first edge sharpening method and the second edge sharpening method are different; and
printing the image data using the sharpened edge pixel.

8. The control method of claim 7, wherein in the first edge sharpening, sharpening is performed by adjusting a luminance value of the color edge pixel with reference to luminance values of pixels adjacent to the color edge pixel.

9. The control method of claim 8, wherein in the first edge sharpening, if the luminance value of the color edge pixel is greater than a predetermined maximum threshold value, the luminance value of the color edge pixel is adjusted to the maximum threshold value, and if the luminance value of the color edge pixel is lower than a predetermined minimum threshold value, the luminance value of the color edge pixel is adjusted to the minimum threshold value.

10. The control method of claim 9, wherein the maximum threshold value is equal to or greater than a maximum luminance value of pixels adjacent to the color edge pixel, and the minimum threshold value is equal to or lower than a minimum luminance value of pixels adjacent to the color edge pixel.

11. The control method of claim 7, further comprising:
determining whether the sharpened color edge pixel is included in one of yellow, cyan, and magenta color domains, and adjusting upwards a color level corresponding to the color edge pixel within a color domain including the color edge pixel if the sharpened color edge pixel is included in one of the yellow, cyan, and magenta color domains.

12. The control method of claim 7, further comprising:
performing smoothing filtering of non-edge pixels of the image data.

13. The control method of claim 7, wherein in the determining whether the detected edge pixel is a color edge pixel or a black edge pixel, if a saturation value of the edge pixel is greater than a predetermined threshold value it is determined that the edge pixel is a color edge pixel, and if a saturation value of the edge pixel is lower than the predetermined threshold value it is determined that the edge pixel is a black edge pixel.

14. The image forming apparatus of claim 1, wherein the image data is scanned image data.

15. The method of claim 7, wherein the image data is scanned image data.

16. An image forming apparatus, comprising:
an pixel edge determining unit to determine whether image input data includes an edge pixel of an image, and to output determined edge pixels on a separate output path than determined non-edge pixels;
an edge processing unit to divide determined edge pixels into black edge pixels and non-black edge pixels by using a chrominance component of the edge pixels, and to output black edge pixels on a separate output path than non-black edge pixels;
a black edge sharpening unit to apply a first sharpening method to the black edge pixels;
a non-black edge sharpening unit to apply a second sharpening method to the non-black edge pixels such that the first sharpening method and the second sharpening method are different and the second sharpening method includes determining an area of the image data where the non-black edge pixel is located and adjusting a luminance value of the color edge pixel with reference to luminance values of pixels adjacent to the color edge pixel in the determined area; and
a print unit to print the image input data using the sharpened black edge pixels and the sharpened non-black pixels.

17. The image forming apparatus of claim 16, wherein the edge processing unit determines whether a determined edge pixel is a black edge pixel or a non-black edge pixel by calculating a saturation value from the image input data having a YCbCr value corresponding to the respective determined edge pixel and comparing the calculated saturation value to a predetermined threshold value.

* * * * *